June 14, 1927.

J. ROBINSON 1,632,714

AUTOMATIC TRAIN PIPE COUPLING

Original Filed June 15, 1921    2 Sheets-Sheet 2

INVENTOR
Joseph Robinson,
BY Watson, Coit, Morse & Grindle,
ATTORNEYS

Patented June 14, 1927.

1,632,714

UNITED STATES PATENT OFFICE.

JOSEPH ROBINSON, OF MORRISTOWN, NEW JERSEY.

AUTOMATIC TRAIN-PIPE COUPLING.

Application filed June 15, 1921, Serial No. 477,759. Renewed November 6, 1926.

My invention relates to improvements in automatic train pipe couplings, and its object is to provide an improved support for such couplings which will permit free universal movement to the coupling head and which will be simple in construction, efficient in operation, and economical of manufacture.

I attain these objects by, and my invention resides in, the combinations, arrangements, and constructions hereinafter described, pointed out in the appended claims, and illustrated in the accompanying drawings in which:

Figure 1:
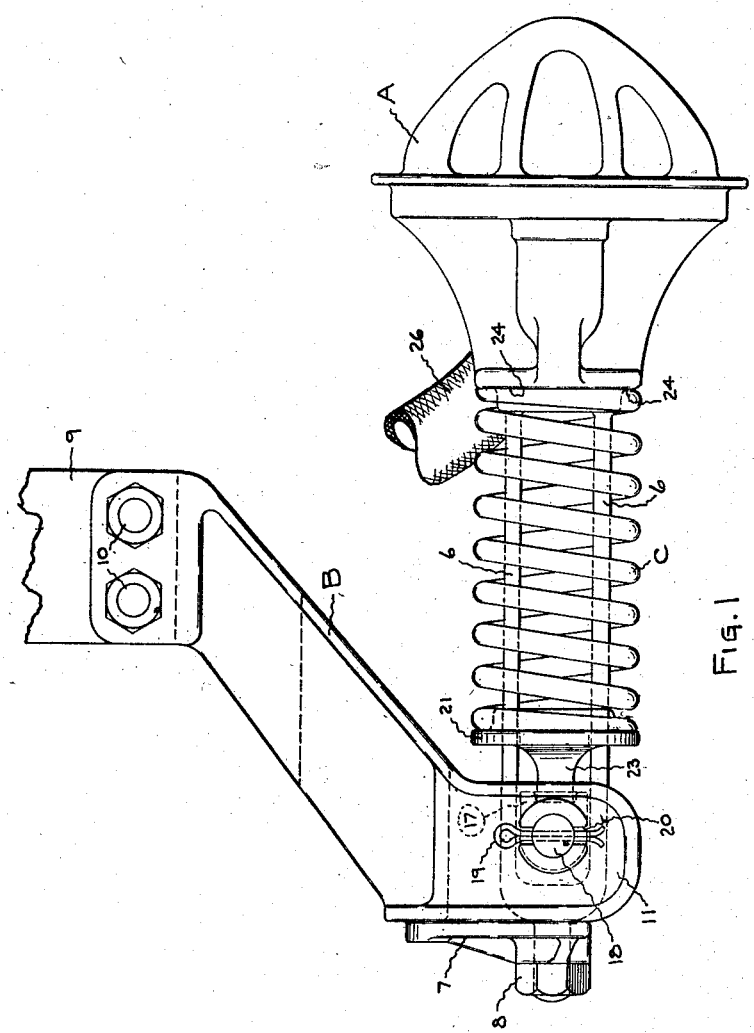
Figure 1 is a side elevation of my improvement.
Figure 2:
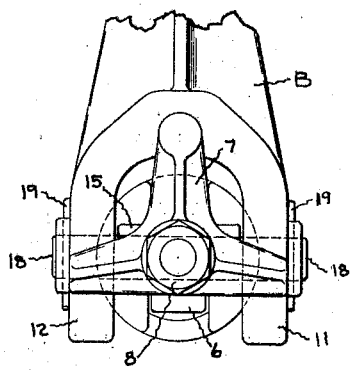
Figure 2 is a rear elevation thereof with the coupling head omitted and the upper portion of the bracket broken away.
Figure 3:
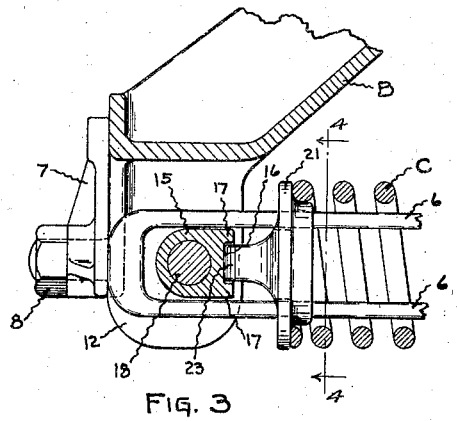
Figure 3 is a sectional elevation through my improvement, and showing particularly the universal joint. In this view the coupling head, and a part of the spring, are omitted.
Figure 4:
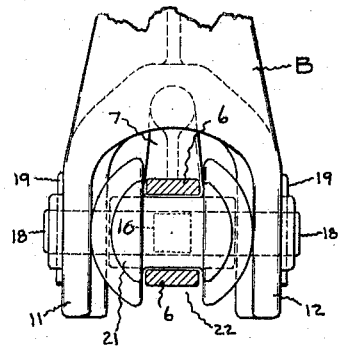
Figure 4 is a sectional elevation of the line 4—4 of Figure 3 with the spring omitted.
Figure 5:
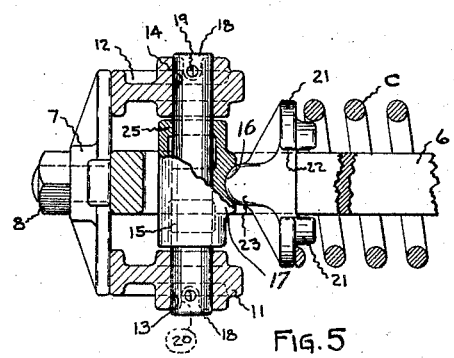
Figure 5 is a sectional plan view of the structure shown in Figures 2 and 3.

Referring now to the drawings; my improvement includes the usual coupling head A having a shank or part 6 comprising a pair of straps spaced apart one above the other as shown. The shank extends rearwardly from the head, with which it is connected in any suitable manner, to a stop 7 at the rear of the bracket B, the stop being adjustably secured to the shank as by a nut 8. The bracket B is connected to the usual lug 9 of the car coupler as by bolts 10, and terminates at its lower end in a pair of vertically extending spaced prongs 11 and 12 which span the shank 6 and which are provided with alined openings 13 and 14, shown particularly in Figure 5. Extending through the shank 6 I provide a hollow member or pivot block 15 having upon its front face a seat or bearing 16 the upper and lower ends of which are closed by the walls 17. Spanning the space between the prongs 11 and 12 of the bracket B and passing through the openings 13 and 14 and through the hollow member 15, I provide a bar 18 round in cross section and upon which the member 15 is adapted to rotate in the vertical plane, and this bar I fix against movement in the openings 13 and 14 by means of cotter pins 19 which pass through the bar 18 into the slots 20 formed in the prongs 11 and 12. A spring seat 21 having oppositely disposed grooves or slots 22 occupied by the straps of the shank 6, is provided with a projection or boss 23 having a curved face adapted to rest in the bearing 16 of the member 15, upon which member the seat has rocking movement in the horizontal plane. A suitable compression spring C surrounds the shank 6 and rests at one end on the seat 21 and at the other end against an annular shoulder 24 formed at the rear side of the coupling head A. The spring serves to yieldingly sustain the head in front of the bracket B with the stop or projection 7 normally in engagement with the rear side of the bracket. This spring is of course under substantial initial compression the extent of which may be varied by turning up on the nut 8. The seat 21 is assembled by passing it edgewise through the shank 6 and turning it to the vertical position before the member 15 or bar 18 are inserted. It will be observed that the member is provided with a plurality of interior annular surfaces or rings 25 to reduce friction, and the danger of fouling, between this part and the bar 18. The member 15 may, of course, be formed semi-circular in cross section if desired, and the usual train pipe hose 26 may be connected with the coupling head in any suitable manner. Excessive rotation of the head about its longitudinal axis is prevented by the co-action of the part 6, the seat 21, the member 15, the bar 18 and the bracket B.

What I claim is:

1. In an automatic train pipe coupling, a bracket forked at its lower end, each prong of the fork being provided with a perforation, a tubular member positioned between the prongs of said bracket, a bar spanning the opening between said prongs and extending through said tubular member into said perforations and fixed against rotation therein, said member being adapted to rock upon the front face of said bar, a seat for a spring seated upon said member and adapted under certain conditions to rock with the member and under other conditions to rock on the member, a stop at the rear of said bracket, a coupling head in front of the bracket, a part spanning said member and said bar and connected wth said stop at one end and with said head at the other end, and a spring surrounding said part and confined between said head and said seat and mounted on the latter.

2. In an automatic train pipe coupling, the combination of a bracket having a pair of spaced prongs at its lower end each of which is provided with an opening, a coupling head carrying a shank which is positioned between the prongs of said bracket and which carries at its rear end a projection, said shank having spaced portions, a hollow member extending between said spaced portions of said shank and having a bearing, a seat for a spring having a part engaging said bearing for rocking movement thereon, a spring confined between said head and said seat for extending the head, and a bar extending through said shank and through the hollow in said member into the openings in said prongs and removably fixed against rotation in the latter, said member being adapted to rock upon said bar.

3. In an automatic train pipe coupling, the combination of a bracket having a pair of spaced prongs at its lower end each of which is provided with an opening, a coupling head carrying a shank which is positioned between said prongs and which carries at its rear end a stop, said shank comprising spaced straps, a hollow member occupying the opening between said straps and having a bearing, a spring seat having a portion lying between said straps and engaging said bearing for rocking movement thereon, said seat having oppositely disposed openings through which said straps extend, a spring surrounding said shank and confined between said head and said seat, and a bar extending through said shank and through the hollow in said member into the opening in said prongs and removably fixed against rotation in the latter, said member being adapted to rock upon said bar.

4. In an automatic train pipe coupling, the combination of a bracket having spaced portions at its lower end provided with openings, a bar extending between said portions of the bracket and rigidly secured in said openings, a member arranged between said portions of the bracket and having a tubular opening through which said bar extends, said member being rotatable on said bar, a seat for a spring bearing against the front face of said member and arranged for pivotal movement relative thereto in a plane including the axis of said bar, a coupling head, a part extending from said head to the rear of said bracket and having spaced portions lying on opposite sides of said member and said bar, said part having a projection for engaging the rear side of the bracket, and a spring arranged between said head and said seat.

In testimony whereof I hereunto affix my signature.

JOSEPH ROBINSON.